May 1, 1962 — C. D. VISOS — 3,032,424
SLIDE CONTROL FOR TOASTERS
Filed Sept. 28, 1959 — 2 Sheets-Sheet 2
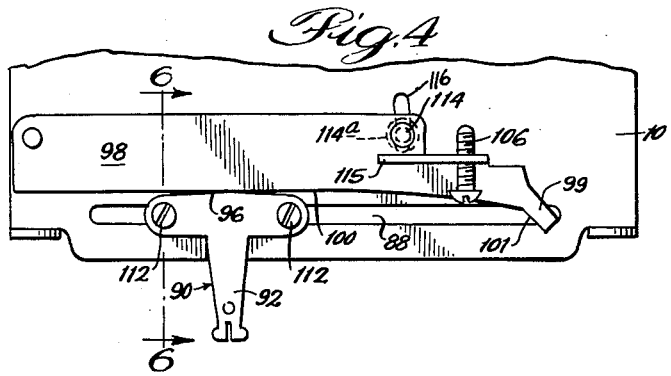
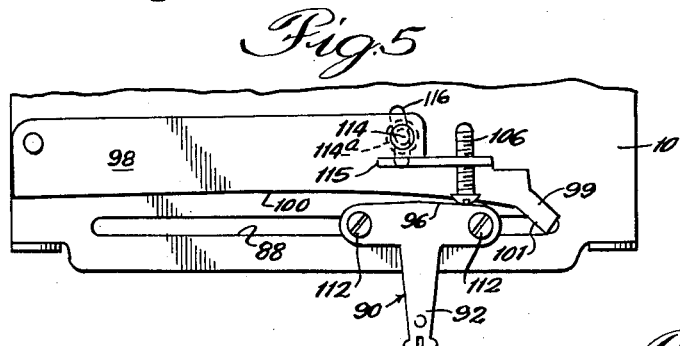
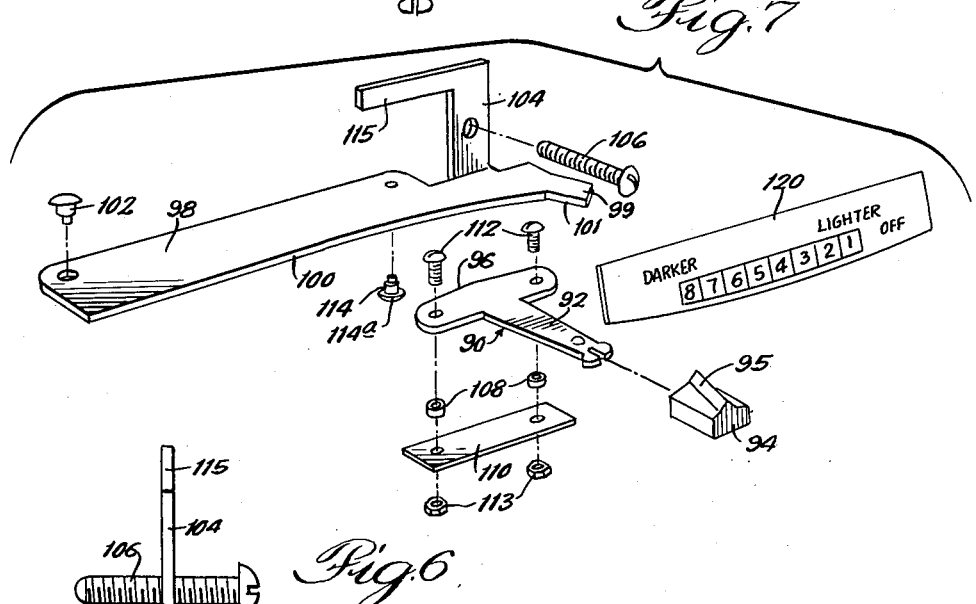
INVENTOR:
Charles D. Visos,
BY Bain, Freeman & Molinare
ATTORNEYS.

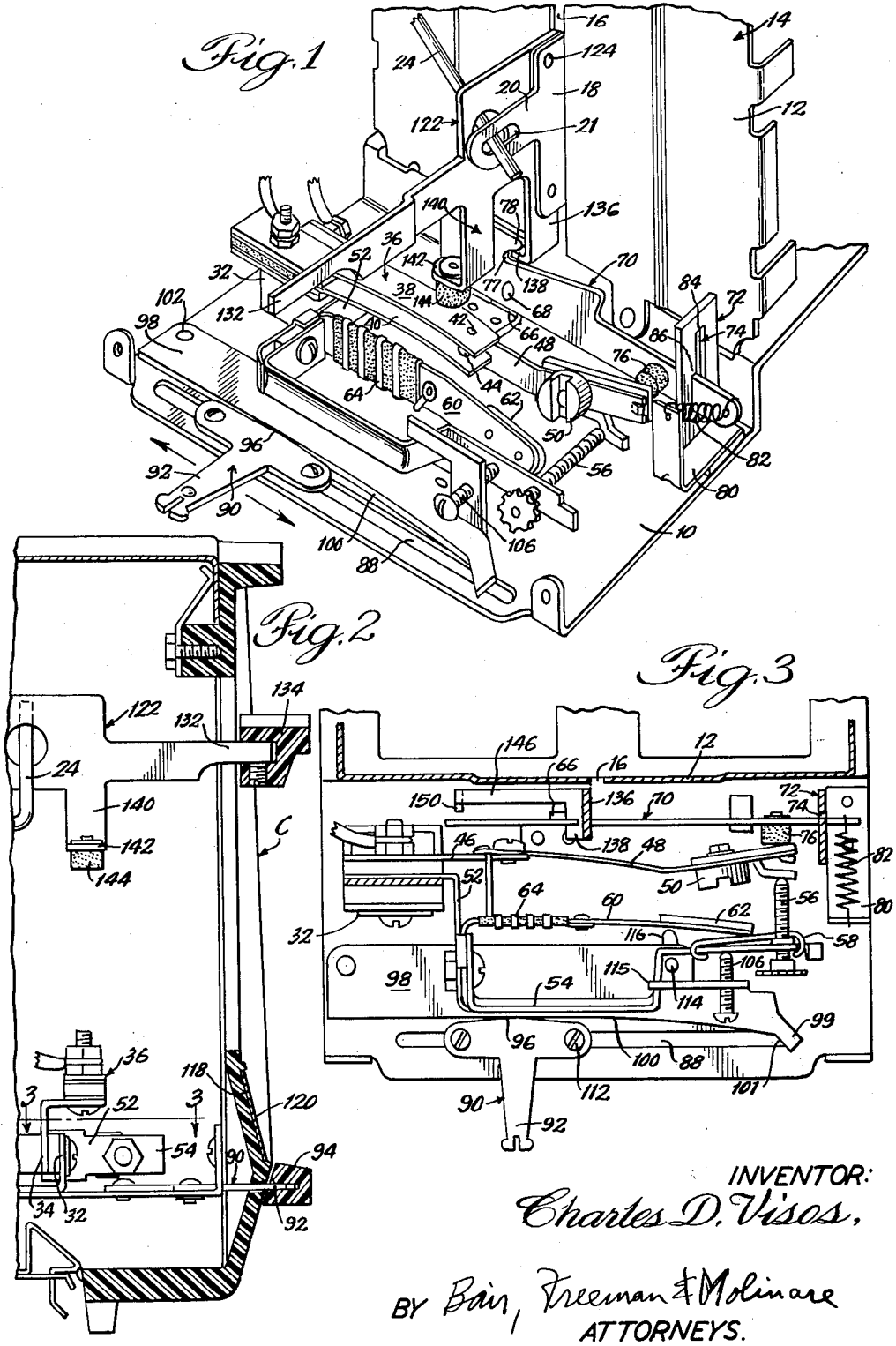

United States Patent Office 3,032,424
Patented May 1, 1962

3,032,424
SLIDE CONTROL FOR TOASTERS
Charles D. Visos, St. Louis, Mo., assignor to Knapp-Monarch Company, St. Louis, Mo., a corporation of Delaware
Filed Sept. 28, 1959, Ser. No. 842,760
5 Claims. (Cl. 99—329)

This invention relates to a slide control mechanism for toasters, and more particularly relates to a slide-type toast-color control particularly for use with toaster control means wherein certain control elements thereof are selectively variably spaced to achieve variability of control.

One object of this invention is to provide a slide-type toast-color control for a toaster.

Another object of this invention is to provide a slide-type color control for a toaster which is characterized by simplicity and economy of construction and effectiveness of operation.

In most automatic or semi-automatic toasters means are generally provided (1) for maintaining or latching the toast carrier in a toasting position from whence the carrier is moved after a toasting period has been terminated, and (2) for controlling the length of a toasting period either as a function of time or as a function of color of the toast. In such systems there usually exists an electrical or mechanical system for automatically terminating the toasting period and for initiating movement of the bread carrier away from its toasting position.

It is desirable to provide such automatic toasters with means which permits of selective manual control of the toasting period, thereby permitting termination of the toasting period prior to operation of the automatic control provided for that purpose.

Thus, a further object of this invention is to provide a slide-type toast-color control which performs a combined function of controlling the color of the toast produced and of also selectively terminating a toasting period.

Still another object of this invention is to provide a slide-type toast-color control which performs a combined function of controlling the color of the toast produced and of also selectively initiating movement of the bread carrier away from its toasting position.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

FIGURE 1 is a perspective view of the interior of an end chamber of a toaster provided with an impact-type toasting period control and provided with the improved slide-type toast-color control described herein;

FIGURE 2 is a fragmentary, partly in cross-section, view, taken in a vertical plane, of the control end of a toaster embodying the invention disclosed herein;

FIGURE 3 is a view taken on line 3—3 of FIGURE 2;

FIGURE 4 is a top-plan view of the slide-type toast-color control showing the parts thereof in one position;

FIGURE 5 is similar to FIGURE 3 but shows the parts in another position;

FIGURE 6 is a cross-section view taken on line 5—5 of FIGURE 3; and

FIGURE 7 is an exploded perspective view of certain parts of the color control herein disclosed.

Referring now to the drawings, there is shown in FIGURE 1 the interior of the end portion of a toaster which includes, as part of the frame means of the toaster, a base member 10 and an upright partition 12. It will be understood that to the right of the partition 12, as viewed in FIGURE 1, there are the toasting chambers within which the bread is toasted, and to the left of upright panel 12, as viewed in FIGURE 1, is an end chamber generally designated by the numeral 14, within which end chamber are mounted the controls of this invention.

There is provided an elongated passageway 16 in the upright panel 12, through which extends a control arm 18 that is connected to, and moves with the bread carrier which is positioned on the opposite side of panel 12. Although only one end chamber of this toaster is shown herein, it will be understood that the opposite end of the toaster may be provided with a similar upright partition through which extends a similar control arm. The control arm 18 is provided with an extension 20, as best seen in FIGURE 1, which has an elongated aperture 21 therethrough. The extensions 20 cooperate with lever arms 24 which are adapted to be actuated by an appropriate means (not shown), such as a spring or a solenoid, for effecting movement of the control arms 18 and the bread carriage connected thereto to an elevated position. A typical system is disclosed in my co-pending application, Serial No. 772,897, filed Nov. 10, 1958. What has thus far been described is established construction and forms no part of the invention herein.

Now, some of the controls which are illustrated generally in the end chamber 14, as seen in FIGURE 1, are of the type generally disclosed in the issued Patent No. 2,778,902 and in a co-pending application, Serial No. 842,761, filed September 28, 1959. Briefly, there is provided a support bracket 32 mounted on the base 10 and which carries a second bracket 34, upon which is mounted the main energizing switch 36 of the toaster. The switch 36 includes an upper leaf spring 38, a lower leaf spring 40, and contacts 42 and 44 respectively carried by said leaf springs. Under normal conditions, and with the bread carriage in its up position, the contacts 42 and 44 are spaced apart. The bracket 32 also supports a laterally extending bar 46, upon which is mounted a leaf spring 48 which carries thereon a magnet 50. There is also provided, carried on bracket 32, an angle-shaped arm 52 of resilient spring blade material. The spring arm 52 carries a relatively rigid laterally extending arm 54, which carries at the extended end thereof an adjustable headed bolt 56. A wire-spring-type lock means 58 is provided for cooperating with bolt 56 to maintain the bolt 56 in its selected positions. The spring arm 52 also supports a laterally extending bimetal 60 which carries a magnet keeper 62 and which has a portion thereof wound with a resistance wire 64. The various parts that are mounted on bracket 32 are appropriately insulated from each other, as is well known in the art, and as is disclosed in Patent No. 2,778,902.

In addition to the foregoing, there is provided a bracket 66 mounted on base 10, which carries thereon a headed pivot pin 68, and there is provided an elongated latch lever 70 which is mounted in a wobbly manner for pivoting on the shank of pin 68. There is provided another bracket 72 mounted on the base 10 and spaced from pin 68, and the bracket 72 is shaped to define therein a labyrinth means 74 for cooperation with the extended end of the latch lever 70. The lever 70 carries an abutment member 76 against which an impact means, comprising leaf spring 48 and magnet 50 thereon, is adapted to strike. The lever 70 is shaped to define a recess 77 which is overlain by a hook element 78 for cooperation with the bread carrier in a manner as hereinafter described. A bracket 80 mounted on base 10 provides means for attachment thereto of one end of a spring 82, the other end of which connects with the extended end of lever 70. The labyrinth means 74 defines therein a first terminal edge 84, against which the lever 70 abuts when the lever 70 is in raised position, and a second terminal edge 86 against which the lever abuts when the lever is in the position seen in FIGURE 1. It will be understood that the lever means thus described corresponds generally with the lever means disclosed in Patent No. 2,778,902.

Now, in the improved toaster herein disclosed, there is provided a track means in the base 10 which includes an elongated slot 88 extending over the greater portion of the width of base 10. An actuator 90 is positioned for movement along the track means which includes slot 88, and said actuator has a laterally extending arm 92 which is adapted to extend outwardly of the shell of the toaster and is adapted to have a control knob 94, with a raised indicating edge 95 thereon, connected thereto. The actuator 90 also provides a convex control edge 96. An elongated cam plate 98, having a gradually varying cam edge 100, is arranged to engage the control edge 96 of the actuator 90. The operative length of cam edge 100 is substantially equal to the range of movement of actuator 90 along the track means, although a small portion of movement of actuator 90 along the track means is reserved for effecting premature release of the bread carriage as hereinafter described. The cam member 98 is pivotally mounted on base 10, laterally of the track means including slot 88, by means of pivot pin 102 and the extended end of cam 98 is shaped to define an upstanding flange 104 which carries thereon an adjustable bolt 106 which is adapted to bear against the arm 54.

The actuator 90 includes a flat part of greater dimension than the width of slot 88, so as to overlie said slot, and there is provided a pair of spaced annular spacers 108 positioned in slot 88 and adapted to engage opposite longitudinal edges of the slot 88 to maintain movement of actuator 90 along slot 88. A flat retainer 110 engages the under side of base 10, and screws 112 passing through annular spacers 108 and cooperating with nuts 113 secure the parts of actuator 90 together.

The extended end of cam plate 98 is provided with an inclined, or release-cam, portion 99 having an inclined, or release-cam, edge 101 which makes an included angle of about 135° with edge 100. The release-cam portion 99 extends sharply relative to the remainder of cam 98 and, as seen in FIGURES 1, 3, and 4, the release-cam portion 99 extends transversely across the slot 88 adjacent one end thereof, namely the end furthest from pivot pin 102.

The cam plate 98 also carries a headed rivet 114, the shank of which cooperates with an elongated arcuate slot 116 in base 10, to permit of the necessary range of pivotal movement of cam 98, and the head 114a of rivet 114 cooperates with the under side of base 10 to prevent the cam 98 pulling away from base 10. The upstanding flange 104 is provided with a laterally extending portion 115 which overlies a portion of the arm 54 and limits movement of that part which would tend to effect disalignment.

As seen in FIGURE 2, the toaster is normally provided with a shell, or casing C which encloses the toasting chamber and the end control chamber 14. For use with the slide-type control herein disclosed, the casing C is provided with an inclined surface 118 which carries an indicia plate 120 thereon with which the indicator portion 95 of the control knob cooperates to indicate the relative color being effected on the toast being toasted.

The control arm 18 of the bread carrier carries thereon a handle generally indicated at 122, which is mounted for limited pivotal movement in a vertical plane on the shank of a headed pin 124. The handle 122 has the greater portion thereof positioned in the end chamber 14, but the length of handle 122 is such that an extended portion 132 thereof is positioned outwardly of the casing C, and said extended end 132 of the handle carries a manual control knob 134.

As best seen in FIGURE 1, the handle 122 is provided with a first downwardly extending foot portion 136 terminating in a laterally extending flange 138. There is also provided a second downwardly extending foot portion 140, having a laterally extending flange 142 at the lower end thereof, and the flange 142 carries thereon a ceramic switch closing element 144. Extending laterally of the flange 138 is an extension which is positioned between lever 70 and panel 12 and which is adapted to be swung against the lever 70 to effect pivoting of lever 70 in a horizontal plane on pin 68 to effect unlatching of lever 70, as described in the copending application, Serial No. 842,761.

In the operation of the device herein disclosed, the control knob 134 is manually engaged and depressed after bread has been deposited on the bread carrier. As the handle 122 moves downwardly, the ceramic button 144 engages the upper leaf 38 of switch 36 and causes deflection thereof to close the switch 36 to initiate energization of the heating elements in the toaster. At substantially the same time, the flange 138 engages a portion of the upper edge of the latching lever 70, which would then normally be in its raised position abutting against edge 84, and depresses the lever along a first traverse portion (the vertical portion) of the labyrinth means 74. When the lever 70 is moved into alignment with a second traverse portion (the horizontal portion) of the labyrinth means 74, the spring 82 is operative to pivot the lever 70 about its wobble mounting on pin 68, to swing the lever to the position shown in FIGURE 1, thereby restraining the lever 70 in a lowered, latching position. In the movement of the lever 70 to the lowered position of FIGURE 1, the hook 78 on lever 70 is swing laterally above the flange 138 to the position seen in FIGURE 1, so that when the handle 122 is released, the hook 78 engages flange 138, thereby retaining the bread carriage in the lowered toasting position.

Simultaneously with the energization of the heating elements of the toaster, and by the closing of the switch 36, the heater 64 wrapped around bimetal 60 is energized and the heat therefrom causes the bimetal 60 to warp in the direction of the magnet 50, and this continues until the magnet keeper 62 and magnet 50 effect contact by reason of proximity and magnetic force developed therebetween. Immediately upon contact between keeper 62 and magnet 50 there is established a short circuit, which reduces the heating effect of heater 64, and this permits bimetal 60 to cool, thereby swinging the bimetal back toward its original position. Such movement by the bimetal bends the leaf spring 48, thereby potentializing said member, and when the extended end of member 48 engages the tip of bolt 56 further movement of member 48 is halted, and then as the bimetal 60 continues to cool, suddenly a point is reached where the forces tending to separate keeper 62 and magnet 50 are greater than the magnetic forces, and then keeper 62 and the magnet 50 separate, thereby releasing the potentialized leaf spring 48 which swings against the ceramic abutment 76 to dislodge the lever 70 from the position shown in FIGURE 1 into alignment with the first traverse portion of the labyrinth 74. The mechanism thus described constitutes a timing means for automatically timing-out the period of toasting and it will be appreciated that the length of the toasting period may be varied by adjusting the spacing of parts which controls the amount of swing necessary before spring 48 is released from bimetal 60.

The spring 82 is inclined so that a portion of the force thereof automatically effects movement of the lever 70 to its first restrained position in abutment with the edge 84, and in this position the latch lever 70 releases flange 138, thereby permitting the bread carriage to be raised to an elevated position. This operation corresponds with that disclosed in the Visos Patent No. 2,778,902.

By reason of the presence of spring member 52, the member 54 is spring-biased against the extended tip of adjustment bolt 106, thereby spring-biasing the cam plate 98 against the actuator 90. It will be observed that, by lateral movement of the actuator 90 the position at which the extended end of leaf spring 48 engages the tip of abutment bolt 56 is varied, as is best seen by comparison of FIGURES 4 and 5. The curve of cam edge 100 is so selected that movement of actuator 90 from right to left along edge 100 gradually effects movement of bolt 106 outwardly and this effects change of the toasting period to obtain color control as indicated by the arrangement of indicia on plate 120. The relative movement is also observed by comparing the relative position of rivet 114 in arcuate slot 116. The relative positioning of bolt 106 changes the period of time lapsing between the time of first closing of switch 36 to the time when the potentialized leaf spring 48 is released to effect unlatching of the latch lever 70, and by this means the period of toasting is varied to select the color of the toast desired. By moving the actuator 90 to the full right-hand position, the actuator 90 engages the inclined portion 99 of the cam 98 and thrusts the cam sharply forward an amount sufficient for the abutment bolt 56 to force the extended end of leaf spring 48 against the abutment member 76, to effect selective release of the latch lever 70 prior to the termination of the normal toasting period.

The handle 122 provides means for selectively effecting discontinuation of the toasting period and raising of the bread carrier to its elevated position prior to the termination of the normal toasting period. When in the lower latched positon as shown in FIGURE 1, a party may lift upwardly on the knob 134, thereby pivoting handle 122 about the axis of pin 124. Such movement causes the extension of flange 138 between panel 12 and lever 70 to engage the portion of the lever located laterally of the wobble pin 68, and causes the lever to pivot about wobble pin 68 in a horizontal plane so as to move the extended end of latch lever 70 along the second traverse portion of the labyrinth means 74 and away from engagement with the abutment 86 and into alignment with the first traverse portion of labyrinth means 74, which is in vertical alignment with abutment 84, whereupon the spring 82 again exerts its influence on latch lever 70 to cause same to move upwardly to the up position, thereby releasing the bread carriage from its lowered latched position, and permitting restoring means to restore the bread carrier to its raised position and simultaneously opening switch 38 to terminate the toasting cycle, as disclosed in the co-pending application, Serial No. 842,761.

While the type of toaster herein described contemplates use of a spring to restore the bread carriage to its upper position, it will be understood that the slide-type color control or carriage-release control herein disclosed need not be used with only that means for raising the bread carriage, and, obviously, any mechanical or electrical means for raising the bread carriage, such as levers, springs, solenoids, motors or the like, may be used in combination with the slide-type controls here disclosed.

Furthermore, while the release-cam 99 is shown as extending at about 45° across the run of slot 88, it will be evident that said angle may be varied, or even a curved or radiused cam edge on release-cam 99 may be provided, it only being essential that sufficient movement of cam member 98 be effected, under influence of actuator 90, to effect selective release of the bread carriage from restraint in the toasting position, whereupon other means may effect raising of the bread carriage to the up position.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States, is:

1. A toast-color control for use with a toaster comprising, in combination: frame means for a toaster, timing means including a pair of variably spaced elements for selectively varying the length of a toasting period and for automatically timing-out a toasting period, latching means for restraining a bread carriage in a toasting position, elongated track means on said frame means, an actuator slidably mounted on said track means for selective movement therealong, an elongated cam member having a cam edge adapted to engage said actuator, resilient means biasing said cam member against said actuator, means movable with said cam member in response to selective movement by said actuator along a first portion of said track means for selectively varying the spacing of said pair of spaced elements for controlling the degree of toasting effected by the toaster, and means movable with said cam member in response to selective movement by said actuator along a second portion of said track means for selectively releasing the latching means to free said bread carriage from restraint in said toasting position.

2. A toast-color control for use with a toaster comprising, in combination: frame means for a toaster, timing means including a pair of variably spaced elements for selectively varying the length of a toasting period and for automatically timing-out a toasting period, latching means for restraining a bread carriage in a toasting position, elongated track means defined on said frame means, an actuator slidably mounted on said track means for selective movement therealong, an elongated cam member having a cam edge adapted to engage said actuator, said cam edge including an elongated, gradually varying cam edge portion and a release-cam edge portion, for controlling the degree of toasting effected by the toaster when the actuator engages said gradually varying cam edge portion and for selectively releasing the latching means to free said bread carriage from restraint in said toasting position when the actuator is moved against said release-cam edge portion, resilient means biasing said cam member against said actuator, and means movable with said cam member for selectively varying the spacing of said pair of spaced elements for controlling the degree of toasting effected by the toaster and for selectively releasing the latching means to free said bread carriage from restraint in said toasting position.

3. A toast-color control for use with a toaster comprising, in combination: frame means for a toaster, elongated track means on said frame means, an actuator slidably mounted on said track means for selective movement therealong, an elongated cam member having an elongated gradually varying cam edge engaging said actuator, resilient means biasing said cam member against said actuator, the operative length of said cam edge being substantially equal to the range of movement of said actuator along said track means, said elongated cam member adjacent one end thereof being pivotally mounted laterally of said track means, and said cam member also defining thereon a release-cam portion having a release-cam edge which extends relatively sharply transverse to the gradually varying cam edge, toaster timing means operatively connected with the cam member when the actuator engages said gradually varying cam edge, and toaster-carriage release means operatively associated with the cam member when the actuator engages said release-cam edge.

4. A toast-color control as set forth in claim 2 wherein the elongated cam member is pivotally mounted adjacent one end thereof and wherein said release-cam portion is located at the end of said cam member opposite from said end which is pivotally mounted.

5. A toast-color control as set forth in claim 2 wherein the release-cam edge extends at an included angle of about 135° to the gradually varying cam edge.

References Cited in the file of this patent

UNITED STATES PATENTS

| | | |
|---|---|---|
| 2,253,043 | Nachumsohn | Aug. 19, 1941 |
| 2,279,305 | Drake | Apr. 14, 1942 |
| 2,771,022 | Hollister | Nov. 20, 1956 |